United States Patent [19]

Adkins

[11] Patent Number: 5,563,577
[45] Date of Patent: Oct. 8, 1996

[54] VEHICULAR DISTRESS ALERT SYSTEM

[76] Inventor: Lenwood C. Adkins, 4019 Tennessee Ave., Roanoke, Va. 24017

[21] Appl. No.: 355,895

[22] Filed: Dec. 14, 1994

[51] Int. Cl.$^6$ ....................................................... B60Q 1/26
[52] U.S. Cl. ........................ 340/468; 340/426; 340/479; 340/471; 340/474; 340/438; 362/61
[58] Field of Search ................................... 340/468, 426, 340/479, 471, 474, 438; 362/61

[56] References Cited

U.S. PATENT DOCUMENTS

| | | | |
|---|---|---|---|
| 3,436,728 | 4/1969 | Silverwood | 340/75 |
| 3,514,622 | 4/1968 | Costa et al. | 307/10.0 |
| 3,643,214 | 2/1972 | Chan | 340/468 |
| 3,810,092 | 5/1974 | Tucker | 340/473 |
| 4,354,174 | 10/1982 | Heidman, Jr. | 340/426 |
| 4,792,792 | 12/1988 | Costino | 340/426 |
| 4,796,002 | 1/1989 | Heidman, Jr. | 340/426 |
| 5,140,304 | 8/1992 | Miller | 340/472 |

*Primary Examiner*—John K. Peng
*Assistant Examiner*—Julie B. Lieu

[57] ABSTRACT

A vehicular distress alert system comprising a security flasher mechanism adapted to be coupled to a vehicle's lights and with the security flasher mechanism generating and transmitting a pulsating alert signal when electrically energized for alternately activating and de-activating the vehicle's lights, thereby transmitting a visual distress alert indication; and a switch mechanism coupled to the security flasher mechanism and adapted to be coupled to a vehicle's battery for energizing and de-energizing the security flasher mechanism.

1 Claim, 4 Drawing Sheets

FIG 3
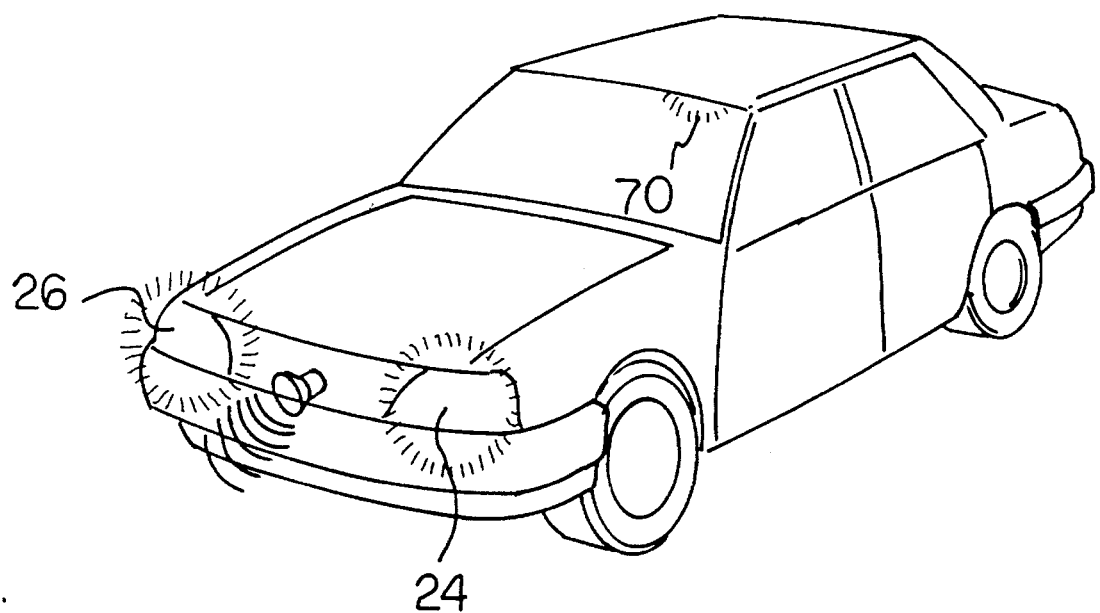
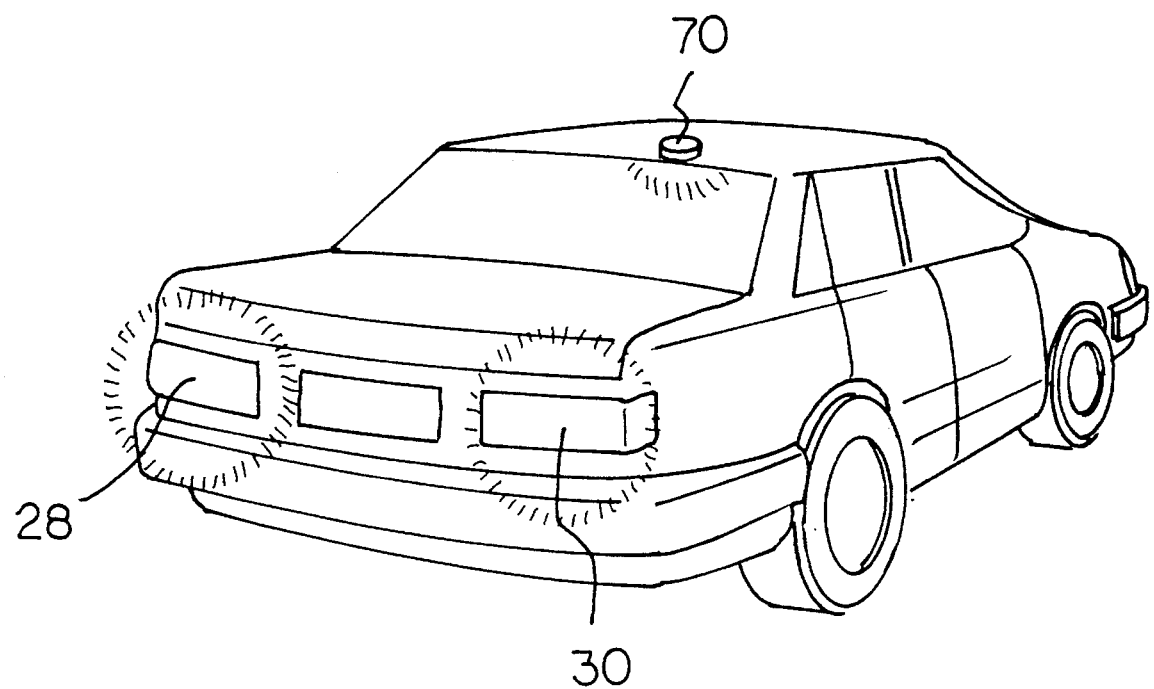
FIG 4

VEHICULAR DISTRESS ALERT SYSTEM

BACKGROUND OF THE INVENTION

1. Field of the Invention

The present invention relates to a vehicular distress alert system and more particularly pertains to alerting those in the vicinity of a vehicle that the personal safety of an occupant within the vehicle is being threatened with a vehicular distress alert system.

2. Description of the Prior Art

The use of vehicular distress systems is known in the prior art. More specifically, vehicular distress systems heretofore devised and utilized for the purpose of warning personnel in the area of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,436,728 to Silverwood et al. discloses a vehicle light and horn signaling control system. U.S. Pat. No. 3,514,622 to Costa et al. discloses an actuator circuit for a vehicle horn. U.S. Pat. No. 3,810,092 to Tucker discloses a warning and distress signal device for a disabled vehicle. U.S. Pat. No. 4,354,174 to Heidman, Jr. discloses a anti-theft door actuated hazard light and horn circuit for automobiles. U.S. Pat. No. 5,140,304 to Miller discloses a siren sound synchronized light bar system.

While these devices fulfill their respective, particular objective and requirements, the aforementioned patents do not describe a vehicular distress alert system that generates visual and audible alert indications by alternately activating and deactivating the parking lights, brake lights, dome lights, and horn of a vehicle for alerting those in the vicinity of the vehicle that the personal safety of an occupant therein is being threatened.

In this respect, the vehicular distress alert system according to the present invention substantially departs from the conventional concepts and designs of the prior art, and in doing so provides an apparatus primarily developed for the purpose of alerting those in the vicinity of a vehicle that the personal safety of an occupant within the vehicle is being threatened.

Therefore, it can be appreciated that there exists a continuing need for new and improved vehicular distress alert system which can be used for alerting those in the vicinity of a vehicle that the personal safety of an occupant within the vehicle is being threatened. In this regard, the present invention substantially fulfills this need.

SUMMARY OF THE INVENTION

In the view of the foregoing disadvantages inherent in the known types of vehicular distress systems now present in the prior art, the present invention provides an improved vehicular distress alert system. As such, the general purpose of the present invention, which will be described subsequently in greater detail, is to provide a new and improved vehicular distress alert system and method which has all the advantages of the prior art and none of the disadvantages.

To attain this, the present invention essentially comprises, in combination, an isolation diode bank formed of a first diode, a second diode, a third diode, a fourth diode, and a fifth diode with each diode having an anode terminal and a cathode terminal and with the cathode terminal of the first diode adapted to be coupled to an anode terminal of a vehicle's left parking light, the cathode terminal of the second diode adapted to be coupled to an anode terminal of a vehicle's right parking light, the cathode terminal of the third diode adapted to be coupled to an anode terminal of a vehicle's left rear braking light, the cathode terminal of the fourth diode adapted to be coupled to an anode terminal of a vehicle's right rear braking light, and the cathode of the fifth diode adapted to be coupled to an anode terminal of a vehicle's horn system. An electrically-energizable security relay coil is included and has a cathode terminal and an anode terminal with the cathode terminal adapted to be coupled to a negative terminal of a vehicle's battery. A security flasher is included and has an anode terminal coupled to the anode terminal of the security relay coil and a cathode terminal coupled to the anode terminals of the diodes and with the security flasher generating and transmitting a pulsating alert signal through the diodes when electrically energized with the alert signal alternately activating and de-activating the vehicle's parking lights, braking lights, and horn. A security relay is included and has a first terminal, a second terminal, and a third terminal and with the second terminal adapted to be coupled to an anode terminal of a vehicle's dome lights and the third terminal coupled to the anode terminals of the diodes. The security relay has a disengaged mode when the security relay coil is electrically de-energized for connecting the first terminal with the second terminal and further having an engaged mode when the security coil is electrically energized for connecting the second terminal with the third terminal. Lastly, a manual activation switch is included. The manual activation switch has a first pole and a second pole. The first pole of the manual activation switch is formed of a first terminal, a second terminal and a third terminal. The second pole of the manual activation switch is formed of a fourth terminal, a fifth terminal and a sixth terminal. The first terminal of the manual activation switch is adapted to be coupled to a positive terminal of a vehicle's battery. The second terminal of the manual activation switch is coupled to the first terminal of the security relay. The third terminal of the manual activation switch is coupled to the anode terminal of the security relay coil. The fourth terminal of the manual activation switch is adapted to be coupled to a vehicle's dome lights. The fifth terminal of the manual activation switch is unused. The sixth terminal of the manual activation switch is adapted to be coupled to a negative terminal of a vehicle's battery. The manual activation switch has a disabled orientation with the first terminal and second terminal of the first pole coupled together and the fourth terminal and fifth terminal of the second pole coupled together. The manual activation switch also has an enabled orientation with the first terminal and the third terminal of the first pole coupled together and the fourth terminal and the sixth terminal of the second pole coupled together for placing the security relay in an engaged mode and allowing the generation and transmission of the alert signal for alternately activating and de-activating the vehicle's parking lights, braking lights, dome lights and horn, thus transmitting visual and audible distress alert indications.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular distress alert system which has all the advantages of the prior art vehicular distress systems and none of the disadvantages.

It is another object of the present invention to provide a new and improved vehicular distress alert system which may be easily and efficiently manufactured and marketed.

It is a further object of the present invention to provide a new and improved vehicular distress alert system which is of durable and reliable construction.

An even further object of the present invention is to provide a new and improved vehicular distress alert system which is susceptible of a low cost of manufacture with regard to both materials and labor, and which accordingly is then susceptible of low prices of sale to the consuming public, thereby making such a vehicular distress alert system economically available to the buying public.

Still yet another object of the present invention is to provide a new and improved vehicular distress alert system which provides in the apparatuses and methods of the prior art some of the advantages thereof, while simultaneously overcoming some of the disadvantages normally associated therewith.

Even still another object of the present invention is to provide a new and improved vehicular distress alert system for alerting those in the vicinity of a vehicle that the personal safety of an occupant within the vehicle is being threatened.

Lastly, it is an object of the present invention to provide a new and improved vehicular distress alert system comprising security flasher means adapted to be coupled to a vehicle's lights for generating and transmitting a pulsating alert signal when electrically energized and thereby alternately activating and de-activating the vehicle's lights, thus transmitting a visual distress alert indication; and switch means coupled to the security flasher means and adapted to be coupled to a vehicle's battery for energizing and de-energizing the security flasher means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the front portion of a vehicle with the present invention activated for generating alternating flashing signals from the front parking lights and dome light thereof and generating alternating audible signals from the horn thereof.

FIG. 4 is a perspective view of the rear portion of the vehicle depicting the present invention in operation for alternately activating the rear braking lights of a vehicle.

The same reference numerals refer to the same parts through the various Figures.

DESCRIPTION OF THE PREFERRED EMBODIMENT

Figure 1:
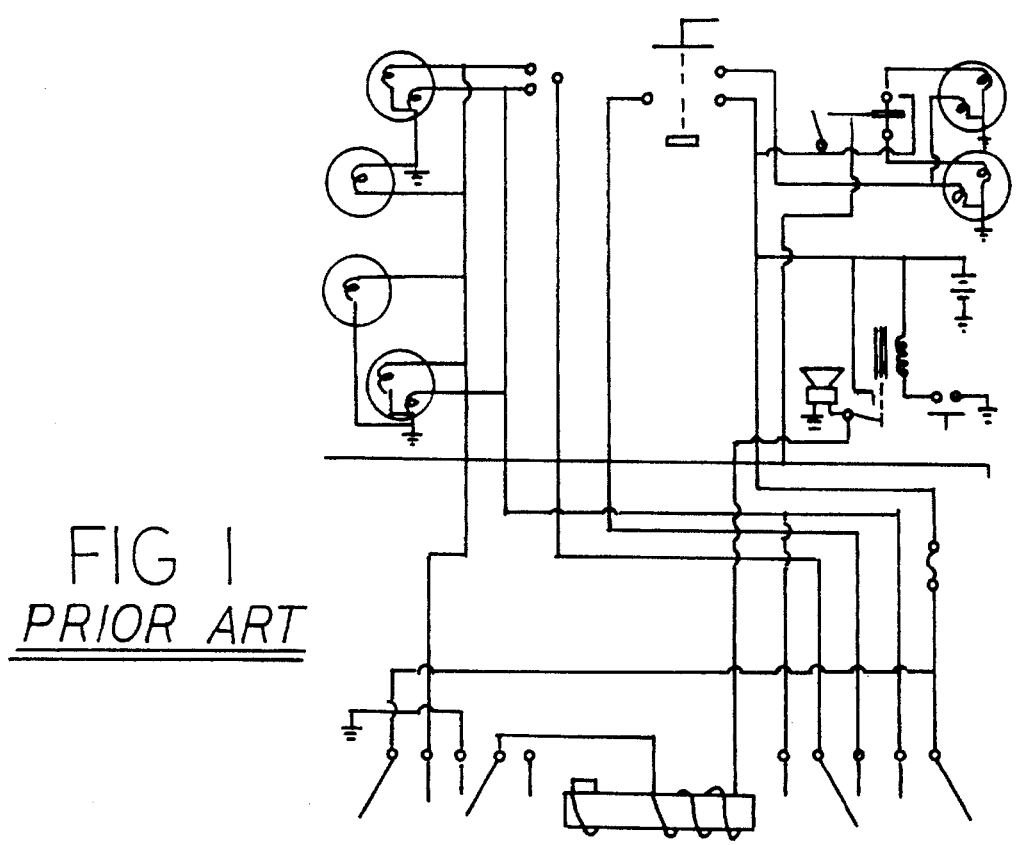
FIG. 1 is a schematic diagram of a prior art vehicle light and horn signaling control system.
Figure 2:
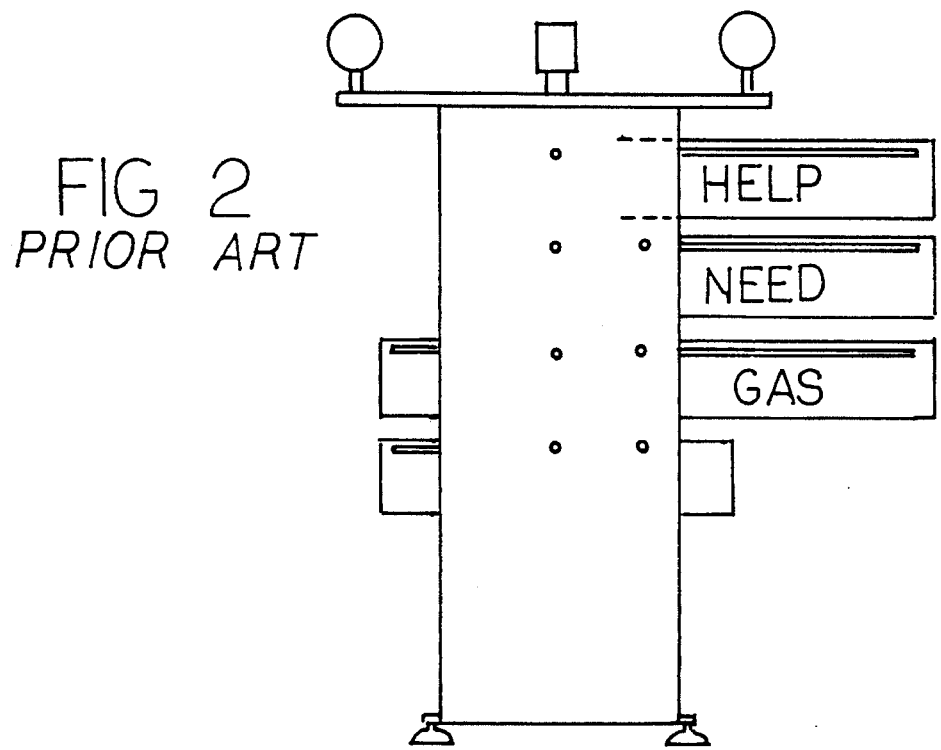
FIG. 2 is a schematic diagram of a prior art warning and distress signal device for a disabled vehicle.
Figure 5:
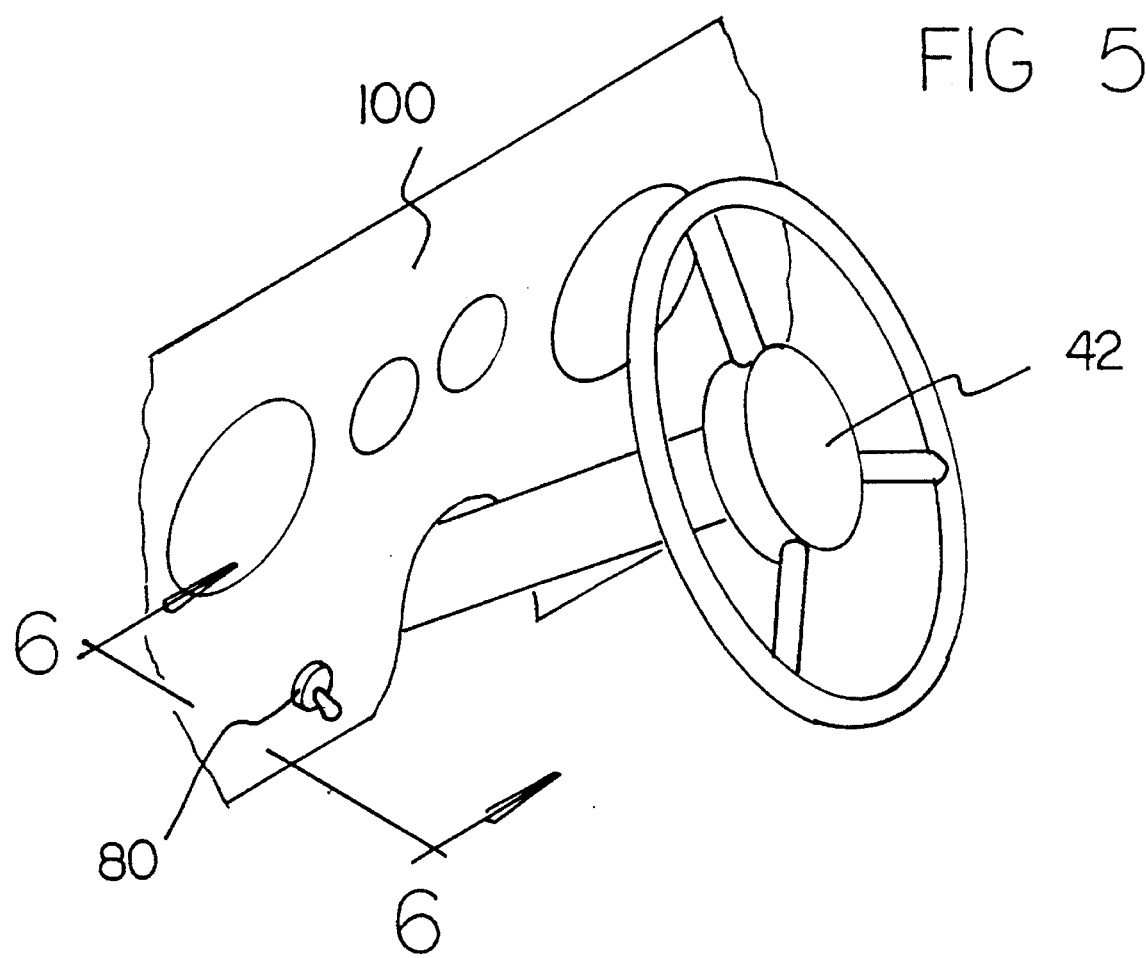
FIG. 5 is a perspective view of the front panel of a driver's compartment depicting the manual activation switch used for enabling the present invention.
Figure 6:
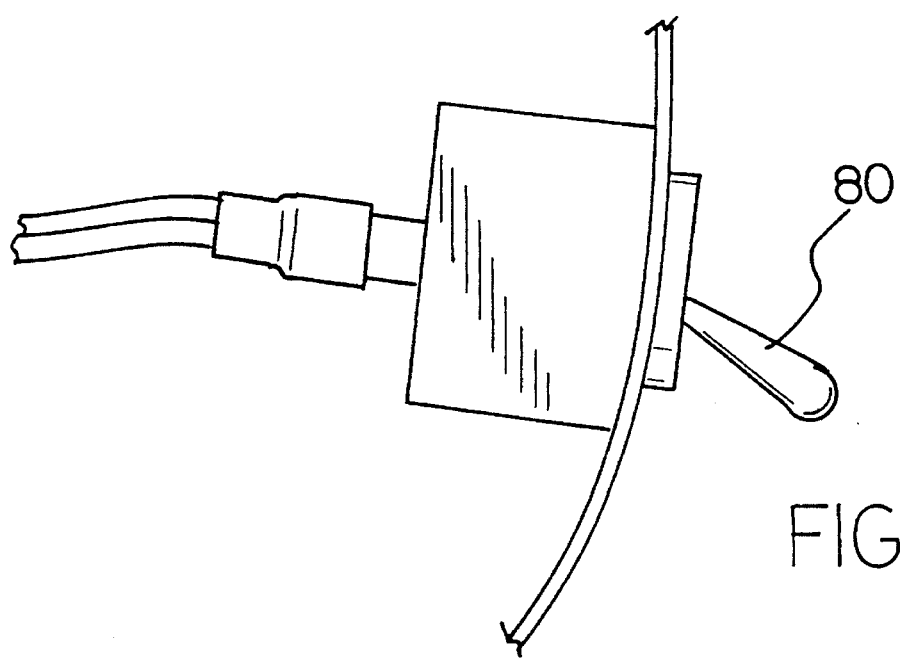
FIG. 6 is a view of the double manual activation switch of the present invention taken along the line 6—6 of FIG. 5.
Figure 7:
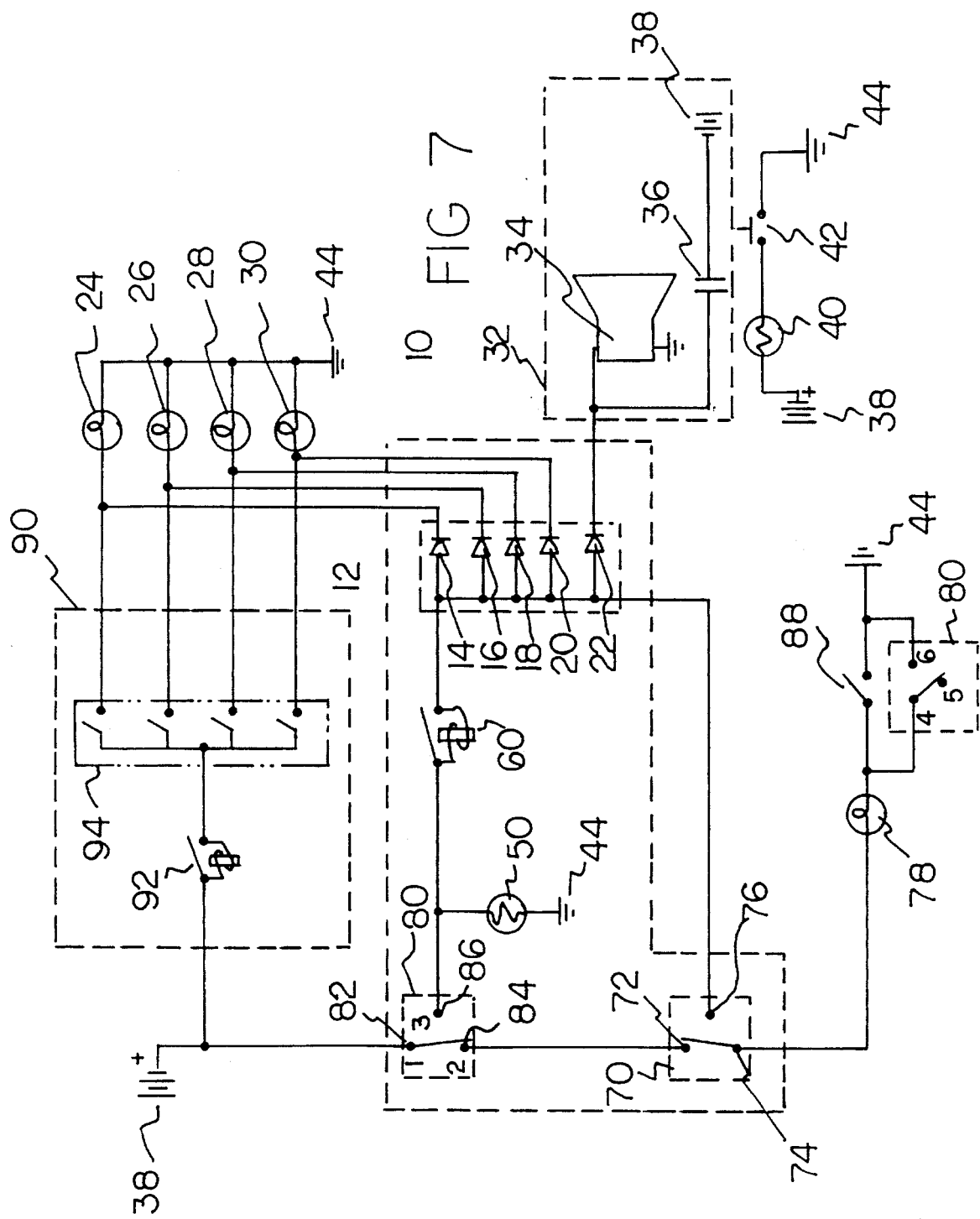
FIG. 7 is a schematic representation of the present invention and its coupling with existing components of a vehicle's electrical system.

With reference now to the drawings, and in particular, to FIG. 3 through 7 thereof, the preferred embodiment of the new and improved vehicular distress alert system embodying the principles and concepts of the present invention and generally designated by the reference number 10 will be described.

Specifically, the present invention essentially includes five major components. The major components are the isolation diode bank, security relay coil, security flasher, security relay, and manual activation switch. These components are interrelated to provide the intended function.

More specifically, it will be noted in the various Figures that the first major component is the isolation diode bank 12. The isolation diode bank is formed of a first diode 14, a second diode 16, a third diode 18, a fourth diode 20, and a fifth diode 22. Each diode has an anode terminal and a cathode terminal. The cathode terminal of the first diode is adapted to be coupled to an anode terminal of a vehicle's left parking light 24. The cathode terminal of the second diode is adapted to be coupled to an anode terminal of a vehicle's right parking light 26. The cathode terminal of the third diode is adapted to be coupled to an anode terminal of a vehicle's left rear braking light 28. The cathode terminal of the fourth diode is adapted to be coupled to an anode terminal of a vehicle's right rear braking light 30. Lastly, the cathode terminal of the fifth diode is adapted to be coupled to an anode terminal of a vehicle's horn system 32. The vehicle's horn system includes a horn 34 and a horn interlock 36 coupled to a positive terminal 38 of a vehicle's battery. The horn system is actuated by a horn relay coil 40 engaged by a horn push button switch 42. The horn relay coil and horn push button switch are serially interconnected between the positive terminal 38 of a vehicle's battery and the negative terminal 44 of a vehicle's battery. The isolation diode bank is used for preventing any extraneous leakage currents generated by ancillary external circuitry connected to the lights or horns from being transmitted to the present invention and then back to the lights and horn, thus causing their inadvertent activation.

The second major component is the security relay coil 50. The security relay coil is electrically-energizable. The security relay coil has a cathode terminal, an anode terminal, and a coil therebetween. The cathode terminal is adapted to be coupled to a negative terminal 44 of a vehicle's battery.

The third major component is the security flasher 60. The security flasher has an anode terminal coupled to the anode terminal of the security relay coil 50 and a cathode terminal coupled to the anode terminals of the diodes of the isolation diode bank 12. The security flasher generates and transmits a pulsating on-off alert signal through the diodes when electrically energized. The alert signal alternately activates and de-activates the vehicle's parking lights 24, 26, braking lights 28 and 30, and horn 34.

The fourth major component is the security relay 70. The security relay has a first terminal 72, a second terminal 74, and a third terminal 76. The second terminal is adapted to be coupled to an anode terminal of a vehicle's dome lights 78. The third terminal of the security relay is coupled to the anode terminals of the diodes of the isolation diode bank 12. The security relay is inductively coupled with the security relay coil 50. The security relay has a disengaged mode or normal mode of operation when the security relay coil 50 is electrically de-energized. When the security relay coil is electrically de-energized, the first terminal 72 is connected with the second terminal 74. The dome lights 78 of a vehicle are further connected to existing door switches 88 and terminals 4 and 6 of the manual activation switch 80 and then to the negative terminal 44 of a vehicle's battery. In the disengaged or normal mode of operation the door switches control the activation of the dome lights. The door switches are opened when the doors of a vehicle are shut, thus preventing the dome lights from being activated. When one of the doors of the vehicle is opened, the respective door switch is closed, thereby activating the dome lights. The security relay also has an engaged mode or alert mode of operation when the security coil is electrically energized. When the security coil is electrically energized, the second terminal 72 is coupled with the third terminal 76, thereby forming a conduction path connecting the security flasher, isolation diode bank, and internal dome lights.

The fifth major component is the manual activation switch 80. The manual activation switch has a first terminal 82, a second terminal 84, and a third terminal 86. The manual activation switch is extended within a driver's compartment of a vehicle at a location near or on the dashboard for manual activation. The first terminal of the manual activation switch is adapted to be coupled to a positive terminal 38 of a vehicle's battery. The second terminal is coupled to the first terminal 72 of the security relay. The third terminal is coupled to the anode terminal of the security relay coil 50. The manual activation switch has a disabled orientation for operation in a normal mode with the first terminal 82 and the second terminal 84 coupled together. The manual activation switch also has an enabled orientation for operation in an alert mode with the first terminal 82 and the third terminal 86 coupled together for activating the security relay coil and thereby placing the security relay 70 in an engaged mode. Once the security relay coil and security flasher are activated, the alert signal is generated and transmitted for alternately activating and de-activating the vehicle's parking lights 24 and 26, braking lights 28 and 30, dome lights 78, and horn 34, thus transmitting visual and audible distress alert indications.

The present invention is associated with the existing hazard flasher system 90 of a vehicle. The hazard flasher system consists of an existing hazard flasher 92 coupled in series with a hazard switch 94. The hazard flasher system is connected between the positive terminal 38 and negative terminal 44 of a vehicle's battery. The hazard switch is coupled to the parking lights and braking lights of a vehicle.

The present invention is different from prior art inventions in three ways. First, the primary purpose of the present invention is to attract attention towards the interior of a vehicle and alert those in the vicinity that the personal safety of those occupying the vehicle is being threatened by a would-be attacker. The present invention gives alert that a crime is either in progress or about to occur inside the vehicle against the occupant or occupants of that vehicle. Furthermore, it is feasible that the activation of this system would scare off a would-be attacker before he or she could inflict bodily harm to the occupant or occupants of the vehicle. Second, the function of the present invention is different from prior art devices in that it incorporates not only the horn system and the exterior front parking lights and rear braking lights as other inventions do, but it also incorporates the interior dome lights of the vehicle to illuminate the interior thereof. This is an important additional function because it allows those in the vicinity to readily identify a crime in progress or an emergency situation inside the vehicle and take action to help the occupant or occupants. Third, the application of the present invention is different from those prior art devices. Because of the simplicity of the necessary electrical wiring involved, the present invention can be easily retro-fitted to vehicles built as far back as 1960 up to present as well as incorporated into the manufacturing processes of new vehicles. Most prior art devices are not conducive to retro-fitting in vehicles already built but would necessitate being installed in the factory during the manufacture of new vehicles. Therefore, the present invention has two methods of incorporation versus one method of incorporation for most prior art devices.

The operation of the present invention is unique in that it lights up the vehicle's interior so that the actions of a would-be attacker against the occupant or occupants of the vehicle can be seen by those in the vicinity. Actually being able to visualize a crime while it is happening would enable a bystander to take immediate defensive measures on behalf of the victim which could save the victim's life or prevent bodily harm. The interior lighting provided by the present invention also enables witnesses as well as the victim to give a more detailed account of the incident and the attacker to law enforcement officers to help with the apprehension and identification of the attacker. Furthermore, introducing light into the vehicle's interior could deter the crime completely as the would-be attacker realizes his or her actions are being seen by those outside of the vehicle. Because of the light, the attacker may decide to flee the scene instead of proceed with the crime.

All components of the present invention are conventional in design and commercially available. The power source for the present invention is the vehicle's battery. A manual activation switch is located in the dash area 100 for activating the system to initiate the flashing of the interior dome lights, the flashing of the rear braking lights and the front parking lights, and the continuous pulsating audible sounding of the vehicle's horn. The present invention is designed so that activation thereof is possible anytime needed whether the vehicle is parked or in operation.

The present invention utilizes existing visual and audible circuitry and devices in present in vehicles since the 1960's. The existing rear braking lights and the front parking or signaling lights and the existing interior dome lights are used as visual alarm sources. The existing horn is used for the audible alarm source for the alerting system. The activation device is a double pole double throw manual activation switch either of a push button or toggle type that can be manually latched in a fixed position. The first terminal of the manual activation switch connects to the vehicle's battery positive source. In the normal operating position, the first terminal and second terminal of the manual activation switch are internally connected. When the manual activation switch is enabled, the first terminal and the third terminal are connected. The second terminal of the security relay is connected to the interior dome light circuitry. Existing door switches are electrically connected between the vehicle's dome lights and the negative side of a vehicle's battery. In the normal position, the door switches are opened.

When the manual activation switch 80 is thrown to the engaged orientation, the battery positive is connected with security flasher's anode terminal. The battery positive is also connected to the anode terminal of the security relay coil 50. The security relay coil is internally connected through a coil winding to a cathode terminal which is electrically wired to the battery negative 44. The security flasher anode terminal is internally connected through its coil winding to the cathode terminal. The security flasher consists of a thermal reactive coil and interlock. When electrical current flows through its coil circuit, the interlock alternately opens and closes and disrupts the flow of current, generating an alternating alert signal that subsequently causes the visual flashing of lights and the audible sounds from the horn. The cathode terminal of the security flasher is electrically connected to the anode terminals of a series of five diodes within a isolation diode bank 12. The cathode terminals of the diodes in the diode bank are electrically connected to the anode terminals of the parking lights and rear brake light filaments. The cathode terminal of the parking lights and rear brake light filaments are electrically connected to the battery negative through the vehicle's existing wiring. The cathode terminal of the fifth diode is electrically connected to the anode side of the horn system which is comprised of a horn and horn interlock coupled to the battery negative. The first terminal of the security relay is connected to the second terminal of the manual activation switch in a normal mode of operation. When the manual activation switch is thrown, the second terminal 74 and the third terminal 76 of the security relay section 70 are electrically connected. The second terminal 74 of the security relay section is electrically connected to the interior dome light circuitry 70. When the manual activation switch is in the normal mode of operation, all standard visual and audible vehicle systems function normally. To activate the present invention, the manual activation switch is thrown. When this is done, the battery positive 34 is connected to the security flasher 60 anode terminal and security relay coil 50 anode terminal. When electrical current flows through its coil circuit, the security flasher alternately opens and closes, thereby disrupting the flow of current causing the visual flashing of lights 24, 26, 28, 30 and the audible sounds from the horn 34. Alternating current flows through the diode bank to lights and horn. Through electrical activation of the security relay coil, the second terminal 74 and third terminal 76 of the security relay are connected. A circuit is thus made through the interior dome lights 78 and through the security flasher switch 60 to contact the fourth terminal of the manual activation switch 80. The sixth terminal of the manual activation switch is connected to battery negative 44. This causes the dome lights to flash and the vehicles parking lights and rear braking lights are illuminated with pulsating current, and the vehicle's horn is pulsating an audible signal. Thus, the present invention generates an alert distress indication to be viewed and heard by those in the vicinity of the vehicle. The present invention may also be used to alert others of the vehicle's failure or alert others of a road hazard and other potentially dangerous situations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A vehicular distress alert system for alerting those in the vicinity of a vehicle that the personal safety of an occupant within the vehicle is being threatened comprising, in combination:

an isolation diode bank formed of a first diode, a second diode, a third diode, a fourth diode, and a fifth diode, each diode having an anode terminal and a cathode terminal with the cathode terminal of the first diode adapted to be coupled to an anode terminal of a vehicle's left parking light, the cathode terminal of the second diode adapted to be coupled to an anode terminal of a vehicle's right parking light, the cathode terminal of the third diode adapted to be coupled to an anode terminal of a vehicle's left rear braking light, and the cathode of the fifth diode adapted to be coupled to an anode terminal of a vehicle's horn system;

an electrically-energizable security relay coil having a cathode terminal and an anode terminal with the cathode terminal adapted to be coupled to a negative terminal of a vehicle's battery;

a security flasher having an anode terminal coupled to the anode terminal of the security relay coil and a cathode terminal coupled to the anode terminals of the diodes and with the security flasher generating and transmitting a pulsating alert signal through the diodes when electrically energized with the alert signal alternately activating and de-activating the vehicle's parking lights, braking lights and horn;

a security relay having a first terminal, a second terminal, and a third terminal and with the second terminal adapted to be coupled to an anode terminal of a vehicle's dome lights and the third terminal coupled to the anode terminals of the diodes, the security relay having a disengaged mode when the security relay coil is electrically de-energized for connecting the first terminal with the second terminal and further having an engaged mode when the security coil is electrically energized for connecting the second terminal with the third terminal; and a single manual activation switch located in the proximity of a dash of the vehicle and having a first pole and a second pole with the first pole formed of a first terminal and a second terminal and a third terminal and with the second pole formed of a fourth terminal and a fifth terminal and a sixth terminal, the first terminal adapted to be coupled to a positive terminal of a vehicle's battery, the second terminal coupled to the first terminal of the security relay, the third terminal coupled to the anode terminal of the security relay coil, the fourth terminal adapted to be coupled to a vehicle's dome lights, the fifth terminal being unused, and the sixth terminal adapted to be coupled to a negative terminal of a vehicle's battery, the manual activation switch having a disabled orientation with the first terminal and second terminal of the first pole coupled together and the fourth terminal and fifth terminal of the second pole coupled together, the manual activation switch further having an enabled orientation upon the manual activation thereof by the occupant with the first terminal and the third terminal of the first pole coupled together and the fourth terminal and the sixth terminal of the second pole coupled together for placing the security relay in an engaged mode and allowing the immediate generation and transmission of the alert signal for alternately activating and de-activating the vehicle's parking lights, braking lights, dome lights and horn, thus transmitting visual and audible distress alert indications.

* * * * *